United States Patent
Simon et al.

(10) Patent No.: US 8,190,942 B2
(45) Date of Patent: May 29, 2012

(54) METHOD AND SYSTEM FOR DISTRIBUTING A GLOBAL TIMEBASE WITHIN A SYSTEM-ON-CHIP HAVING MULTIPLE CLOCK DOMAINS

(75) Inventors: Moshe B. Simon, San Ramon, CA (US); Erik P. Machnicki, San Jose, CA (US)

(73) Assignee: Cradle IP, LLC, Mountain View, CA (US)

( * ) Notice: Subject to any disclaimer, the term of this patent is extended or adjusted under 35 U.S.C. 154(b) by 591 days.

(21) Appl. No.: 12/167,111

(22) Filed: Jul. 2, 2008

(65) Prior Publication Data

US 2010/0005332 A1    Jan. 7, 2010

(51) Int. Cl.
*G06F 1/12* (2006.01)
(52) U.S. Cl. ...................................................... 713/400
(58) Field of Classification Search .................... 713/400
See application file for complete search history.

(56) References Cited

U.S. PATENT DOCUMENTS

| | | | |
|---|---|---|---|
| 4,618,849 A * | 10/1986 | Bruestle | 341/98 |
| 5,293,626 A | 3/1994 | Priest et al. | |
| 5,317,601 A | 5/1994 | Riordan et al. | |
| 5,402,394 A * | 3/1995 | Turski | 368/10 |
| 5,822,381 A | 10/1998 | Parry et al. | |
| 6,396,329 B1 | 5/2002 | Zerbe | |
| 6,591,370 B1 | 7/2003 | Lovett et al. | |
| 6,614,862 B1 * | 9/2003 | Doblar | 375/354 |
| 7,126,408 B2 | 10/2006 | Zerbe | |
| 7,260,652 B2 * | 8/2007 | Fuehrer et al. | 709/248 |
| 7,995,620 B2 * | 8/2011 | Schirmer et al. | 370/503 |
| 2004/0117682 A1 * | 6/2004 | Xu | 713/400 |
| 2004/0151209 A1 | 8/2004 | Cummings et al. | |
| 2006/0095591 A1 | 5/2006 | Kelly | |
| 2006/0129350 A1 * | 6/2006 | West | 702/176 |
| 2006/0239392 A1 | 10/2006 | Cummings et al. | |
| 2007/0016817 A1 | 1/2007 | Albonesi et al. | |
| 2008/0224904 A1 * | 9/2008 | Fujimura | 341/63 |
| 2008/0288805 A1 * | 11/2008 | Osborn et al. | 713/400 |

* cited by examiner

*Primary Examiner* — Khanh Dang
*Assistant Examiner* — Nimesh G Patel
(74) *Attorney, Agent, or Firm* — Schneck & Schneck

(57) ABSTRACT

A global timebase system and method for a system-on-chip synchronizes multiple clock domains in each of a plurality of receiver modules by broadcasting a global timebase count value as Gray code over a global timebase bus. A global timebase generator includes a binary counter and a binary-to-Gray-code converter. Each receiver module registers the global timebase count value with its own local clock and includes a Gray-code-to-binary converter. The converted value, in binary form, may be used as least significant bits of a globally synchronized local timebase. Most significant bits may be generated by a local binary counter incremented at each 1-to-0 transition of the most significant bit of the global timebase count value.

14 Claims, 1 Drawing Sheet

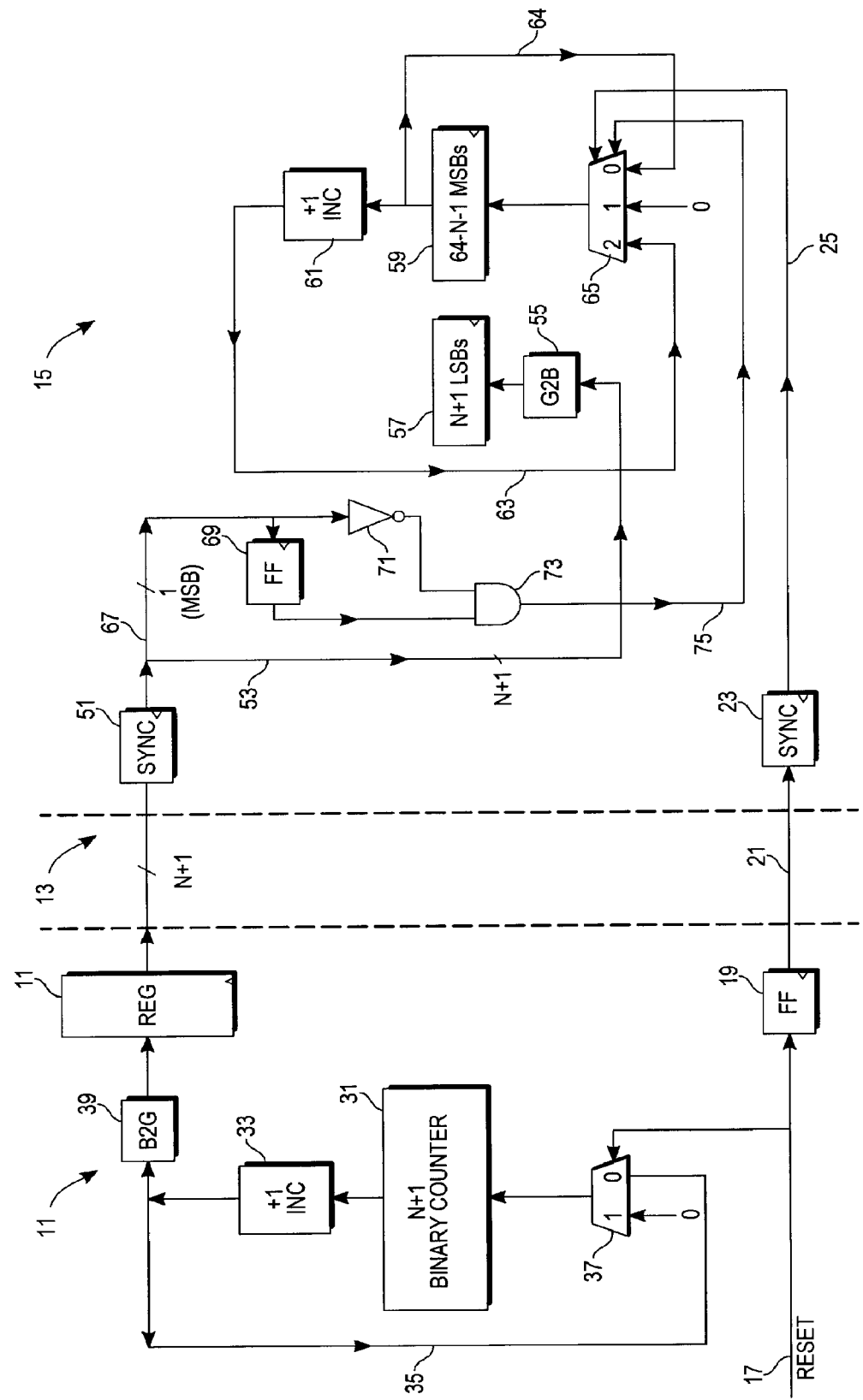

METHOD AND SYSTEM FOR DISTRIBUTING A GLOBAL TIMEBASE WITHIN A SYSTEM-ON-CHIP HAVING MULTIPLE CLOCK DOMAINS

TECHNICAL FIELD

The present invention relates to multiprocessor or system-on-chip devices with global clock or timebase distribution to the plurality of processor nodes operating in their own clock domains.

BACKGROUND ART

In system-on-chip (SoC) devices, in which multiple modules of a processing system are integrated onto a single chip, the modules are often required to operate in close synchrony with each other. However, it is also often the case that the different modules of the system operate at different clock rates, with module clocks derived from different physical time bases. The different module clocks will therefore tend to drift relative to one another, and, even when such drift is random, the deviation between any pair of clocks will, on average, increase over time.

In order to provide the needed synchrony among all modules of a SoC device, a global timebase may be created for use as a reference by all of the modules, wherein each module accesses this timebase for real-time measurements. A variety of methods have been developed to provide the timebase to the modules, e.g., by making a global timebase counter register readable by all modules over a data bus or through a system network.

In U.S. patent application publication no. 2004/0117682, Xu describes a system and method for synchronizing the processors of a multiprocessor platform using a globally accessible clock counter. Each processor accesses its own local time value and adjusts its synchronization parametric in time resource structure whereby the local time value is updated.

In U.S. patent application publication no. 2006/0095591, Kelly describes global timing for a cluster of processor nodes, which corrects for internal clock drift among the nodes by including synchronizing pulses from a master clock.

In U.S. patent application publication no. 2007/0016817, Albonesi et al. describe an architecture wherein each functional block operates with a separately generated clock and where synchronizing circuits ensure reliable inter-domain communication. In particular, an externally generated clock is distributed to the local phase lock loop in each domain.

However, existing methods of distributing a global clock signal to the multiple modules or providing access to timebase values in a counter over a data bus tend to incur significant jitter, high latency and overhead.

SUMMARY DISCLOSURE

A global timebase system for a system-on-chip synchronizes multiple clock domains with reduced jitter and latency by broadcasting a global timebase count value as Gray code to a plurality of receiver modules over a global timebase bus. A global timebase generator comprising a binary counter and a binary-to-Gray-code converter provides the global timebase count value to the global timebase bus. Each of the receiver modules of the system-on-chip registers the broadcast count value with its own local clock. Each receiver module includes a Gray-code-to-binary converter to convert the global timebase count value to binary form. The converted binary value is stored for use as a globally-synchronized local timebase by that receiver module. Each receiver module may additionally include a local binary counter incremented on each 1-to-0 transition of the most significant bit of the registered global timebase count value, and stored for use as most significant bits of the globally-synchronized local timebase, while the converted binary count value is stored for use as least significant bits of that local timebase.

Gray coding allows for a more accurate synchronization between clock domains. Suppose that a count were instead distributed over a timebase bus in binary form. The worst-case transition is from all 1's to all 0's. Since the count is transported in parallel across the bus and registered at the receiving end in parallel, any value between all 0's to all 1's could be captured at the receiver, so the accuracy of the synchronization for a binary transmitted timebase count is equal to the counter clock period multiplied by $2^N$. When the timebase count is instead distributed over the timebase bus in Gray code form, the count captured at each receiving module would be off by at most one count value, since for each increment to the count Gray code changes by only one bit. Thus, the accuracy of the ported value is independent of the width of the counter and is at most one clock period off. The width of the counter and timebase bus is determined by the ratio of the fastest clock period in the system (the counter clock in the generator) relative to the slowest clock (in one of the receiver modules). We want enough bits so that the counter cycles through all of its values slower than the clock period for slowest clock domain. Increasing the number of bits beyond this provides no benefit. The local timebases of each receiver can be extended, as needed, using a local binary counter incremented at each rollover of the global timebase count.

BRIEF DESCRIPTION OF THE DRAWINGS

FIG. 1 is a schematic diagram showing an implementation of a system-on-chip distributing a global timebase in accord with the present invention. For clarity, only one exemplary receiver module among many is shown.

DETAILED DESCRIPTION

With reference to FIG. 1, a system-on-chip in accord with the present invention has a global timebase generator 11 supplying a global timebase to multiple receiver modules 15 (of which only one is shown) over a global timebase bus 13. A global timebase reset signal input 17 is coupled to the generator 11, and also to the several receivers 15 (via a generator output flip-flop register 19, a dedicated line 21 of the bus 13, and receiver synchronizers 23 and receiver reset lines 25), so as to allow synchronous reset of the timebase across all modules of the system-on-chip.

The timebase generator 11 includes a binary counter 31 with a +1 incrementer 33 for incrementing the count by one every local clock cycle of the generator 11. The output of +1 incrementer 33 feeds back into the counter via a feedback path 35 and one input of a multiplexer 37 so as to register the incremented count. Applying an active reset signal to the global timebase reset signal input 17 causes selection by the multiplexer 37 of a zero value so as to reset the count. In a system-on-chip having a clock ratio between the generator and the slowest receiver module that is less than $2^N$, the binary counter 31 should be a N+1 bits counter.

The output of the +1 incrementer 33 also feeds a binary-to-Gray-code (B2G) converter 39, which converts the current binary count to Gray code. As is known, any binary value

[$b_n \ldots b_1 b_0$] may be converted to Gray code [$g_n \ldots g_1 g_0$] by an iterative process: (1) starting with the least significant (rightmost) bit $b_0$, and if the next higher significant bit $b_1$ (to its immediate left) is a 1, then inverting the bit (i.e., $g_0 := 1-b_0$, such that 0 becomes 1 and 0 becomes 1), but otherwise ($b_1 = 0$) leaving it unchanged ($g_0 := b_0$), then (2) continuing with the next higher significant bit $b_1$ by inspecting $b_2$ in the same manner, and then (3) with bits of successively higher significance (if $b_{i+1}=1$, then $g_i := 1-b_i$, else $g_i := b_i$) until all bits have been inspected and either inverted or not. (Note: for the most significant bit $b_n$, the "next higher bit" is considered by definition to be zero, so the most significant bit $b_n$ is never inverted and $g_n = b_n$ always.) This iterative process is readily implemented in known B2G hardware. The output of the B2G converter 39 is stored in a register 41 before being driven onto the global timebase bus 13 for broadcast to the several receiver modules 15 of the system-on-chip.

Each receiver module 15 in the system-on-chip has N+1 synchronizers 51 that receive the N+1 bit Gray-coded counter values from the bus 13. The synchronizers 51 are standard, consisting of two flip-flops in series, both clocked by the local receive-side clock. Due to the nature of Gray code, the synchronizers 51 provide an output 53 that is at most one-bit different from the bus value.

The synchronizers 51 feed the N+1 bit Gray code to a Gray-code-to-binary (G2B) decoder 55, which is latched every cycle into a register 57 for storing the N+1 least significant bits (LSBs) of a count. These LSBs in register 57 should match, within one count value, the count generated by the binary counter 31 of the global timebase generator 11. As is known, any Gray code [$g_n \ldots g_1 g_0$] may be converted to its corresponding binary value [$b_n \ldots b_1 b_0$] by an iterative process: (1) starting with the least significant (rightmost) bit $g_0$, adding modulo 2 all higher significant bits (to the left of $g_0$). If the result is 1 (an odd number of 1's to the left of $g_0$), then the bit is inverted, i.e., $b_0 := 1-g_0$. If the result is 0 (an even number of 1's to the left of $g_0$), then the bit is left unchanged, i.e., $b_0 := g_0$. The procedure proceeds (2) to the next higher significant bit $g_1$ and again the number of 1 bits of higher significance is counted, inverting or not inverting the bit depending on the result of the count, (3) continuing with bits $g_i$ of successively higher significance, until all bits have been evaluated. This iterative process is readily implemented in known G2B hardware. Both the B2G encoder 39 and the G2B decoder 55 are standard components and encode/decode in the binary range 0 to $2^{N+1}-1$.

The several receiver modules 15 also include a 64-N-1 bit binary counter 59 that is incremented every 1-to-0 transition of the most significant bit $g_n$ of the received Gray code value. The most significant bit $g_n$ is fed via line 67 to a flip-flop register 69 and also to an inverter 71, whose respective outputs are logically ANDed by an AND gate 73. The output 75 of the AND gate 73 is a 1-cycle pulse for every 1-to-0 transition on the most significant bit. This output 75 is supplied to one selection control input of a multiplexer 65. The other selection control input receives the global timebase reset signal on reset line 25. A +1 incrementer 61 increments the count by one every local clock cycle of the receiver module 15. The output of +1 incrementer 61 feeds back into the binary counter 59 via a feedback path 63 and one input of a multiplexer 65 so as to register the count whenever 1-cycle pulse is received from AND gate output 75 at the multiplexer 65. An alternative feedback path 64 from the counter 59 simply recycles the current count via another multiplexer input whenever a 1-cycle pulse is not output from the AND gate 73.

Applying an active reset signal on reset line 25 causes selection by the multiplexer 65 of a zero value so as to reset the count.

The invention claimed is:

1. A global timebase system for a system-on-chip, comprising:
   a global timebase generator of the system-on-chip configured to provide a multibit global timebase count value as Gray code;
   a multibit global timebase bus coupled to the global timebase generator to broadcast the global timebase count value; and
   a plurality of receiver modules of the system-on-chip operating in multiple clock domains, each of the receiver modules coupled to the global timebase bus and configured to convert the multibit global timebase count value from Gray code to binary form for use as a globally-synchronized local timebase by the receiver module;
   wherein each of the receiver modules comprises a set of synchronizers for receiving the global timebase count value from the global timebase bus and registering the global timebase count value on each local clock cycle of that receiver module, a Gray-code-to-binary converter configured to convert the registered global timebase count value from Gray code to binary form, and a register for storing the converted global timebase count value for use as the globally-synchronized local timebase by the receiver module; and
   wherein each of the receiver modules further comprises a receiver binary counter configured to be incremented by one on every 1-to-0 transition of a most significant bit of the registered global timebase count value, wherein the receiver binary counter stores most significant bits of the globally-synchronized local timebase and the register stores the converted global timebase count value as least significant bits of the globally-synchronized local timebase.

2. The global timebase system as in claim 1, wherein the global timebase generator comprises a binary counter configured to be incremented by one on every clock cycle so as to provide a binary count value, and a binary-to-Gray-code converter configured to convert the binary count value to the global timebase count value as Gray code.

3. The global timebase system as in claim 1, wherein a global timebase reset signal input is coupled to the global timebase generator and via the global timebase bus to each of the plurality of receiver modules of the system-on-chip, the global timebase generator and each of the receiver modules being configured to reset the global timebase count value and respective globally-synchronized local timebases to zero upon receipt of a global timebase reset signal.

4. The global timebase system as in claim 1, wherein a clock ratio between the global timebase generator and the slowest of the receiver modules is less than $2^N$, and the global timebase count value broadcast on the global timebase bus is N+1 bits wide.

5. A method for synchronizing a system-on-chip having multiple clock domains, comprising:
   generating a multibit global timebase count value as Gray code and broadcasting the same over a multibit global timebase bus of the system-on-chip;
   receiving multibit the global timebase count value in each of a plurality of receiver modules of the system-on-chip and registering the same with a local clock;
   converting the registered global timebase count value from Gray code to binary form in each of the receiver modules; and using the converted binary global timebase count value by the respective receiver module as a globally-synchronized local timebase;

wherein the converted binary global timebase count value in each receiver module is stored in a register for use as least significant bits of a globally-synchronized local timebase, and wherein each receiver module further increments a local binary counter by one on every 1-to-0 transition of a most significant bit of the registered global timebase count value, wherein the receiver binary counter stores most significant bits of the globally-synchronized local timebase.

6. The method as in claim 5, wherein generating a global timebase count value as Gray code incrementing a binary counter by one on every clock cycle so as to provide a binary count value, and converting the binary count value to Gray code so as to provide the global timebase count value.

7. The method as in claim 5, wherein receiving the global timebase count value in each of the receiver modules and registering the same is performed by a set of synchronizers in the receiver module coupled to the global timebase bus and clocked by a local clock of that receiver module.

8. The method as in claim 5, wherein the converted binary global timebase count value in each of the receiver module is stored in a register for use as the globally-synchronized local timebase by that receiver module.

9. The method as in claim 5, further comprising resetting the global timebase count value and respective globally-synchronized local timebases to zero upon receipt of a global timebase reset signal by the system-on-chip, the reset signal being broadcast over the global timebase bus to each of the receiver modules.

10. The method as in claim 5, wherein a clock ratio between a global timebase generator generating the global timebase count value and the slowet of the receiver modules is less than $2^N$, and the global timebase count value broadcast on the global timebase bus is N+1 bits wide.

11. A global timebase system comprising:

means for providing a multibit global timebase count value as Gray code;

bus means for broadcasting the global timebase count value; and a plurality of receiver means operating in multiple clock domains, each receiver means coupled to the bus means and including synchronizer means for registering the global timebase count value on each local clock cycle of that receiver means, means for converting the registered global timebase count value from Gray code to binary form, register means for storing the converted global timebase count value as a registered global timebase count value, and counter means for incrementing by one on every 1-to-0 transition of a most significant bit of the registered global timebase count value, with the registered global timebase count value providing least significant bits of a globally-synchronized local timebase and the counter means providing most significant bits of the globally-synchronized local timebase, for that receiver means.

12. The global timebase system of claim 11 wherein the means for providing a multibit global timebase count value as Gray code includes:

a counter means for providing a binary count value; and
means for converting from the binary count value to Gray code.

13. The global timebase system of claim 11 further comprising means for resetting the global timebase count value and respective globally-synchronized local timebases.

14. The global timebase system of claim 11, wherein a clock ratio between the means for providing a multibit global timebase count value and a slowest one of the plurality of receiver means is less than $2^N$, and the global timebase count value broadcast on the bus means is N+1 bits wide.

* * * * *